United States Patent
Xu et al.

(10) Patent No.: US 9,560,514 B2
(45) Date of Patent: Jan. 31, 2017

(54) METHOD FOR ESTABLISHING CONNECTION BY HNB

(71) Applicant: Samsung Electronics Co., Ltd., Suwon-si, Gyeonggi-do (KR)

(72) Inventors: Lixiang Xu, Beijing (CN); Chunying Sun, Beijing (CN); Hong Wang, Beijing (CN); Xiaoqiang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/046,023

(22) Filed: Feb. 17, 2016

(65) Prior Publication Data
US 2016/0165430 A1    Jun. 9, 2016

Related U.S. Application Data

(63) Continuation of application No. 12/673,223, filed as application No. PCT/KR2008/005445 on Sep. 16, 2008, now Pat. No. 9,271,165.

(30) Foreign Application Priority Data

Sep. 29, 2007   (CN) .......................... 2007 1 0164106

(51) Int. Cl.
| | |
|---|---|
| *G06F 15/16* | (2006.01) |
| *H04W 8/02* | (2009.01) |
| *H04W 24/02* | (2009.01) |
| *H04W 36/00* | (2009.01) |
| *H04W 60/00* | (2009.01) |
| *H04W 84/04* | (2009.01) |

(52) U.S. Cl.
CPC ............... *H04W 8/02* (2013.01); *H04W 24/02* (2013.01); *H04W 36/0061* (2013.01); *H04W 60/00* (2013.01); *H04W 84/045* (2013.01)

(58) Field of Classification Search
CPC ............................. H04W 84/045; H04W 24/02
See application file for complete search history.

(56) References Cited

U.S. PATENT DOCUMENTS

| | | | | |
|---|---|---|---|---|
| 7,209,756 | B2 * | 4/2007 | Yabe | G06F 17/3087 342/357.4 |
| 7,599,692 | B2 * | 10/2009 | Ooki | H04M 15/49 455/405 |
| 7,990,912 | B2 | 8/2011 | Nix et al. | |

(Continued)

OTHER PUBLICATIONS

Mitsubishi Electric, From large lists of potential neighbor cells to self-optimized neighbor cell lists, R3-071239, 3GPP TSG SA WG5 and RAN WG3 LTE Adhoc, Jun. 2007.

(Continued)

*Primary Examiner* — Richard G Keehn
(74) *Attorney, Agent, or Firm* — Jefferson IP Law, LLP

(57) ABSTRACT

The method for establishing a connection by a HNB comprising operations of: the HNB transmitting an "attachment request" message to an operation and maintenance center (OMC); the OMC transmitting an "attachment response" message to the MB; the HNB establishing a connection with an MME indicated by the "attachment response" message. With the method proposed, a UE can switch between HNBs in the same CSG through interface X2. Meanwhile, such information as the radio resource management and so on can be exchanged between two HNBs.

20 Claims, 7 Drawing Sheets

(56) References Cited

U.S. PATENT DOCUMENTS

| | | | | |
|---|---|---|---|---|
| 8,050,653 B2* | 11/2011 | Brown | ............... | H04L 12/5895 455/410 |
| 2001/0055285 A1* | 12/2001 | Tomoike | ............ | H04L 12/2856 370/328 |
| 2003/0087648 A1* | 5/2003 | Mezhvinsky | ....... | G06F 17/3087 455/456.1 |
| 2003/0095520 A1* | 5/2003 | Aalbers | .................. | H04L 29/06 370/338 |
| 2003/0148771 A1* | 8/2003 | de Verteuil | .......... | H04W 64/00 455/456.1 |
| 2005/0136988 A1* | 6/2005 | Villamil | ................. | H04W 8/22 455/567 |
| 2006/0073838 A1* | 4/2006 | Kamali | ............... | A61B 5/0002 455/456.1 |
| 2007/0179843 A1* | 8/2007 | Eichenbaum | ......... | G06Q 30/02 705/14.23 |
| 2007/0287501 A1* | 12/2007 | Hoshina | ............... | H04W 16/02 455/562.1 |
| 2008/0049696 A1* | 2/2008 | Stewart | ............... | G06Q 10/107 370/338 |
| 2008/0076425 A1* | 3/2008 | Khetawat | ............. | H04W 88/12 455/436 |
| 2008/0244148 A1* | 10/2008 | Nix, Jr. | .............. | H04L 41/0856 710/313 |
| 2008/0261557 A1* | 10/2008 | Sim | ...................... | H04W 4/001 455/404.2 |
| 2008/0310611 A1* | 12/2008 | Moriwaki | ......... | H04W 36/0033 379/212.01 |
| 2008/0316994 A1* | 12/2008 | Keevill | ................ | H04W 88/08 370/343 |
| 2009/0005052 A1* | 1/2009 | Abusch-Magder | ... | H04W 24/02 455/446 |
| 2009/0067420 A1* | 3/2009 | Ganesan | ................ | H04W 4/02 370/389 |
| 2009/0191844 A1 | 7/2009 | Morgan et al. | | |
| 2009/0207819 A1* | 8/2009 | Kroselberg | .......... | H04W 88/04 370/338 |
| 2009/0225743 A1* | 9/2009 | Nicholls | ............... | H04J 3/0688 370/350 |
| 2010/0029283 A1* | 2/2010 | Iwamura | ............. | H04J 11/0069 455/437 |
| 2010/0061232 A1* | 3/2010 | Zhou | .................... | H04W 12/06 370/230 |
| 2010/0120461 A1* | 5/2010 | Mori | .................... | H04W 48/02 455/517 |
| 2010/0265867 A1* | 10/2010 | Becker | ............... | H04W 72/005 370/312 |
| 2011/0038431 A1 | 2/2011 | Frederiksen et al. | | |

OTHER PUBLICATIONS

Mitsubishi Electric, Whereability of HNBs, R3-071237, 3GPP TSG SA WG5 and RAN WG3 LTE Adhoc, Jun. 2007.
Alcatel-Lucent, Home eNodeB O&M Aspects, R3-071235, 3GPP TSG RAN3 Meeting#56bis, Jun. 2007.
3GPP TSG-RAN WG3 Meeting #57 R3-071359: X2 availability for HNB Configuration, Samsung, Aug. 24, 2007.

* cited by examiner

METHOD FOR ESTABLISHING CONNECTION BY HNB

CROSS-REFERENCE TO RELATED APPLICATION(S)

This is a continuation application of a prior U.S. patent application assigned Ser. No. 12/673,223, filed Feb. 12, 2010, which issued as U.S. Pat. No. 9,271,165 on Feb. 23, 2016, and which is U.S. National Stage application under 35 U.S.C. §371 of an International application filed on Sep. 16, 2008, and assigned application No. PCT/KR2008/005445, which claims the benefit of a Chinese patent application filed on Sep. 29, 2007, in the Chinese Intellectual Property Office and assigned Serial number 200710164106.5, the entire disclosures of each which are hereby incorporated by reference.

TECHNICAL FIELD

The present disclosure generally relates to communication technology, especially to a method for accessing a network by an HNB (home Node B).

BACKGROUND

A system structure of SAE according to the related art is illustrated in FIG. 1. The system structure of system architecture evolution (SAE) in FIG. 1 is described as following.

User Equipment 101 (hereinafter referred to as UE) is a terminal device used to receive data. 102 EUTRAN, also called ENB, is a radio access network of the LTE SAE, for providing interface through which an LTE mobile station accesses the radio network. Through interface S1, EUTRAN connects to a mobility management entity (MME) 103 and a user plane entity serving gateway (S-GW) 104 in the mobile station. MME 103 is adapted for managing mobile context, session context for the UE, and holding user information on security. S-GW 104 primarily provides a function of user plane. An interface S1-MME is adapted for establishing radio access bearer, forwarding messages from UE to MME through a wireless access network. The combination of MME 103 and S-GW 104 is similar to the original serving general packet radio service (GPRS) support node (SGSN) 106. It is possible that both MME and S-GW locate at the same physical entity. Packet data network (PDN) Gateway 105 is adapted for the functions like accounting, legally monitoring, etc. And it is possible that both the S-GW and the PDN Gateway locate at the same physical entity. SGSN 106 provides routing for data transmission in existing universal mobile telecommunications system (UMTS). An existing SGSN finds a corresponding gateway GPRS supporting node (GGSN) according to an access point name (APN). HSS 107 is a home subscription sub-system for the UE and is adapted for storing user information such as the current location of UE, address of the serving node, security information on the user, activated packet data protocol (PDP) context for the UE and so on. Policy and charging rules function (PCRF) 108 provides quality of service (QoS) policy and accounting rules through interface S7.

In general, a user data stream reaches the S-GW 104 through PDN Gateway 105. Then, through the GPRS tunnel protocol (GTP) channel, data is sent by the S-GW to the ENB where the UE locates in, and now it is sent by the ENB to corresponding UE.

HNB refers to a Node B applied in a home. It also can be applied in such site as a university, a company and so on. HNB is a plug and play device. Difference between an HNB and a general macro node B is that: in general not all user equipments (UEs) can access an HNB. For example, only the UEs in a user's home or that are allowed to access the HNB can access the corresponding HNB. And for the HNB in a company, only the company's staff and its allowed partners can access the HNB. The HNB group (e.g., the HNB in a company) bearing the same access subscriber cluster is called closed subscriber group (CSG). No interface X2 (interface between Node Bs in SAE) exists between general HNBs (e.g., the HNBs in homes) or between an HNB and a macro Node B. Through interface S1, a UE switches between HNBs or between an HNB and a macro Node B.

For an HNB applied in a company or university or the like, a UE frequently moves between two HNBs in the same company. In this case, the switch is always implemented through interface S1 so that great delay causes and efficiency is very poor. In addition, information such as radio resource management and so on cannot be exchanged between two HNBs in the same company so that resources cannot be utilized effectively.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for establishing a connection by a Home Node B HNB.

To achieve the object mentioned above, a method for establishing a connection by a HNB comprising operations of: the HNB transmitting an "attachment request" message to an operation and maintenance center (OMC); the OMC transmitting an "attachment response" message to the HNB; the HNB establishing a connection with an MME indicated by the "attachment response" message;

With the method proposed in the present disclosure, a UE can switch between HNBs in the same CSG through interface X2. Meanwhile, such information as the radio resource management and so on can be exchanged between two HNBs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Figure 1:
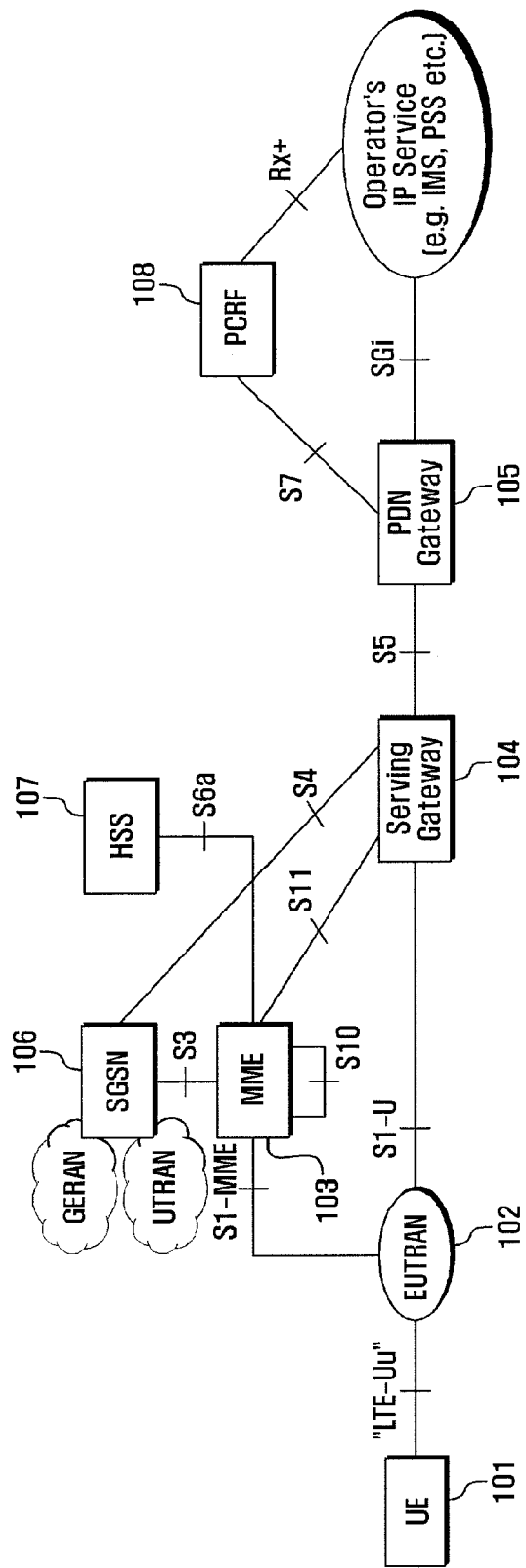
FIG. 1 shows a network structure of SAE according to the related art.
Figure 2:
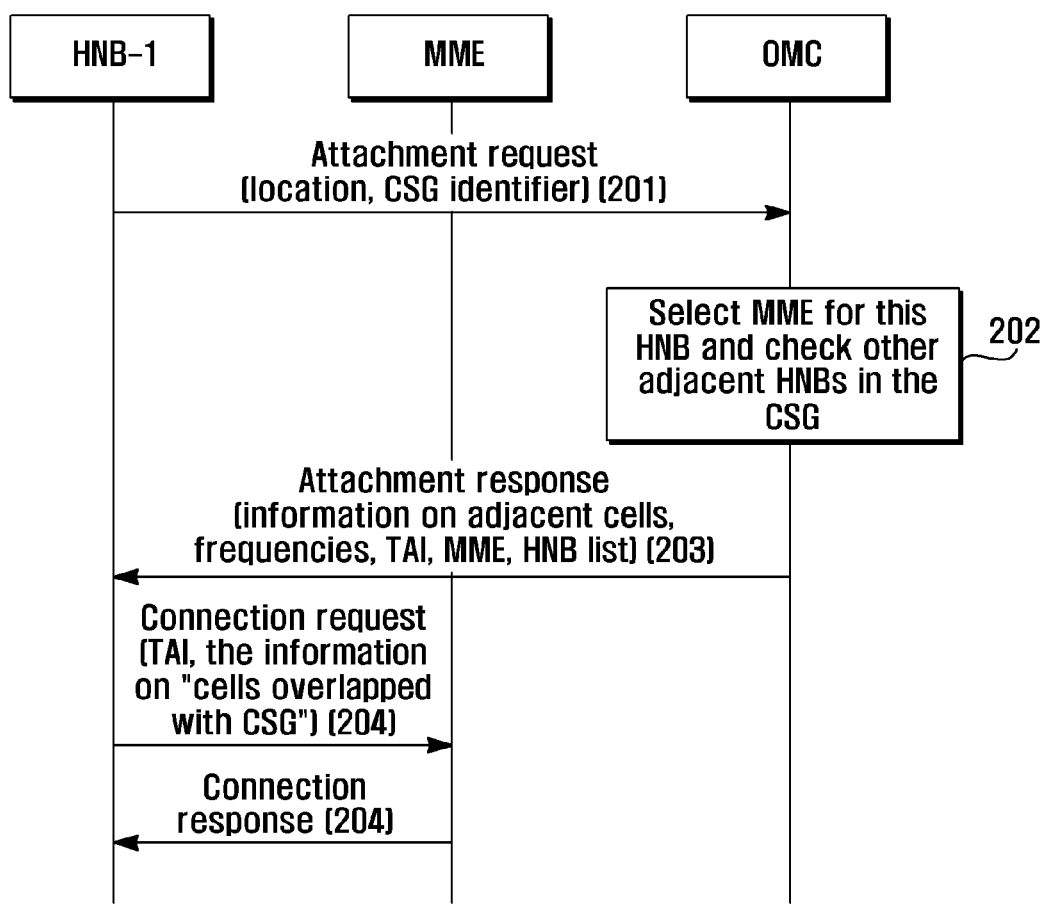
FIG. 2 shows a process that a connection is established for HNB in embodiment 1 of the present disclosure.

It is to be understood that the singular forms "a," "an," and "the" include plural referents unless the context clearly dictates otherwise. Thus, for example, reference to "a component surface" includes reference to one or more of such surfaces An embodiment 1 of the present disclosure is illustrated in FIG. 2. Following is a detailed description with reference to FIG. 2. Detailed technical description for the known components is omitted. In this embodiment, within a CSG, HNB1 is a first HNB that accesses the network.

In operation 201, HNB1 transmits an "attachment request" message to the OMC. This message contains information on a location of the HNB. Optionally, the "attachment request" message contains an identifier of the CSG to which the HNB belongs. Optionally, the network assigns the CSG identifier to HNB (the first HNB or the first group of HNBs within the CSG) when HNB signs in, or knows the identifier of the CSG to which the HNB (not the first signed in group of HNBs in the CSG) belongs when HNB signs in.

In operation 202, OMC selects an MME for the HNB. Within the CSG, the HNB is the first one that accesses the network. OMC selects an MME for it among the MMEs adjacent to the HNB according to a certain rule such as for balancing the load, reducing a possibility of changing MME when UE moves, and so on. Optionally, OMC may select an S-GW for the HNB according to the same rule as on the selection of MME. HNB and OMC check other HNBs in the CSG which need to establish X2 connection with the HNB. According to the CSG identifier, OMC checks other HNBs in the CSG which need to establish X2 connection with the HNB. Optionally, the addresses of the HNBs are considered when OMC checks other HNBs in the CSG which need to establish X2 connection with the HNB. For example, it is not necessary to establish interface X2 between two HNBs if the two HNBs that are in different countries but in the same company belong to the same CSG. In this embodiment, no other HNB exists in the CSG.

The process of selecting S-GW for HNB can be implemented by the MME connected to the HNB when data is transferred through the HNB. Therefore, the HNBs in the same CSG connect to the same S-GW. If it is necessary for the first HNB in the CSG to establish the user plane, MME selects an S-GW for the CSG according to such rules as to balance load or to reduce the possibility of changing S-GW when a UE moves, and so on.

In operation 203, OMC transmits an "attachment response" message to the HNB. This message indicates the MME selected by the OMC for the HNB. Optionally, this message indicates other HNBs necessary to establish X2 connection and adjacent to the HNB. Optionally, the message contains the frequency for using the HNB. The "attachment response" message contains the information on adjacent cells. The "attachment response" message contains a track area identifier (TAI) for the HNB. The "attachment response" message contains the identifier assigned to the HNB. Optionally, the message contains an address of the S-GW that OMC selected for the HNB.

In operation 204, HNB initiates a process to establish a connection with the MME indicated by the message. HNB transmits a "connection request" message to MME. The message contains the information on "cells which are overlapped with HNB or CSG". Optionally, the message contains an information element of the identifier of the TAI where HNB locates in. Optionally, the message contains the information element of the identifier of HNB. Optionally, the message contains the information element of the identifier of the CSG where HNB locates. MME transmits a "connection response" message to HNB.

Figure 3:
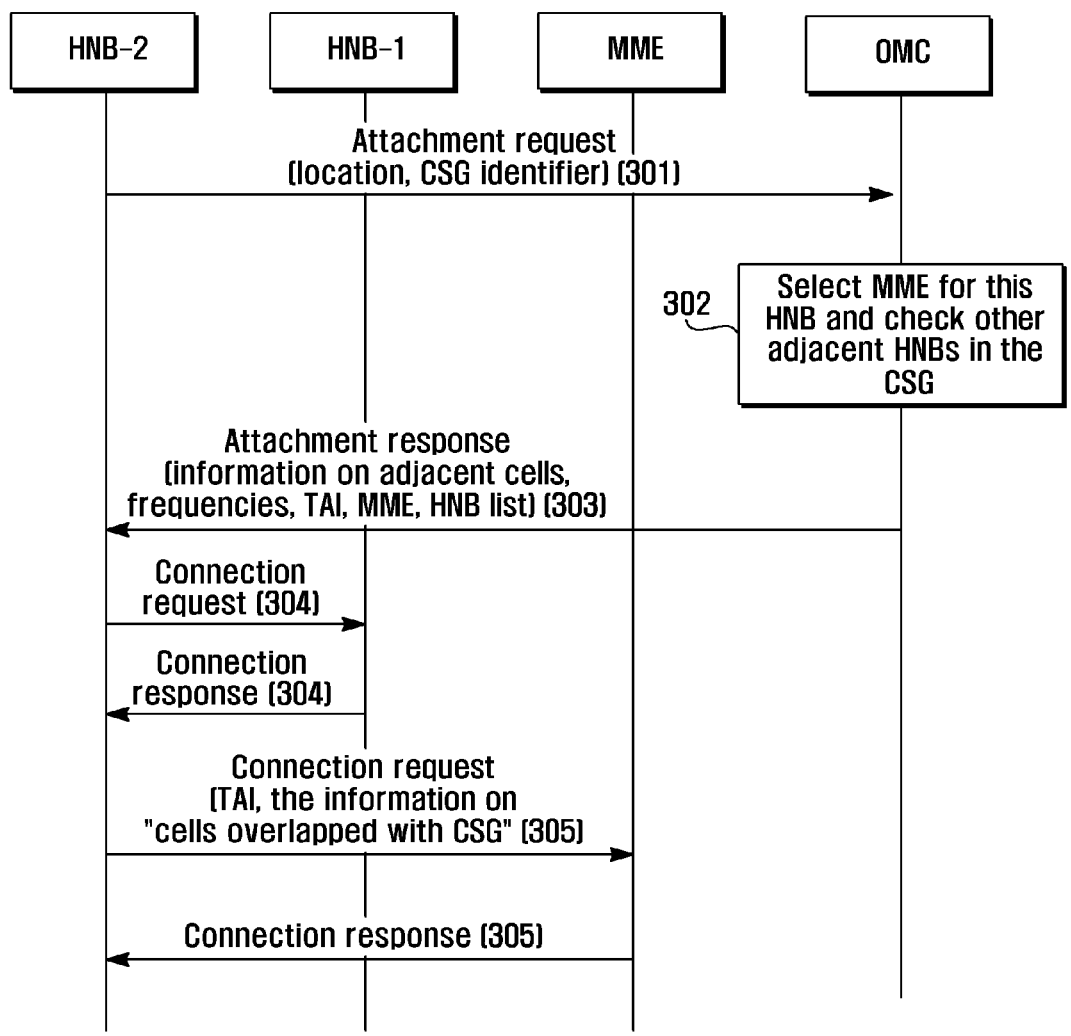
FIG. 3 shows the process that a connection is established for HNB in embodiment 2 of the present disclosure.

Embodiment 2 of the present disclosure is illustrated in FIG. 3. Following is detailed description to the FIG. 3. Detailed technical description for known components is omitted. In this embodiment, HNB1 and HNB2 belong to the same CSG. HNB1 has accessed the network. And HNB2 begins to accessing the network for a first time.

In operation 301, HNB2 transmits the "attachment request" message to the OMC. This message contains the information on the location of HNB2. Optionally, the "attachment request" message contains the identifier of the CSG to which the HNB2 belongs. Optionally, the network knows the identifier of the CSG to which the HNB belongs when HNB signs in.

In operation 302, OMC selects an MME for the HNB. If the HNB is not the first to access the network in the CSG, the MME selected by OMC for other HNBs in this CSG is just the one that the HNB should connect to. In this embodiment, OMC assigns both the MME and the S-GW selected for HNB1 to the HNB. Optionally, the address the HNB should be considered when OMC selects MME for the HNB. For example, if two HNBs that are in different countries but in the same company belong to the same CSG, they may not be able to connect to the same MME. In this case, if no adjacent HNB accesses the network, OMC thinks that this HNB is the first one which accesses the network in the CSG and selects an MME for it according to rules such as balancing load or reducing possibility of changing MME when a UE moves, and so on. Optionally, selection of S-GW for the HNB can be implemented by OMC according to the same rules on the selection of MME. OMC checks other HNBs in the CSG which need to establish X2 connection with the HNB. And according to the CSG identifier, OMC checks other HNBs in the CSG which need to establish X2 connection with the HNB. Optionally, the addresses of the HNBs, as well as whether the HNBs share the same CSG or not, are considered when OMC checks other HNBs in the CSG which need to establish X2 connection with the HNB. For example, it is not necessary to establish interface X2 between two HNBs if the two HNBs that are in different countries but in the same company belong to the same CSG. In this embodiment, for example, it is necessary to establish X2 connection between HNB1 and HNB2.

The process of selecting S-GW for HNB can be implemented by the MME connected to the HNB when data is transferred through the HNB. Therefore, the HNBs in the same CSG connect to the same S-GW. If it is necessary for the first HNB in the CSG to establish the user plane, MME selects an S-GW for the CSG according to such rules as to balance load or to reduce the possibility of changing S-GW when a UE moves, and so on. If the HNB is not the first necessary to establish a user plane in the CSG, the S-GW selected by MME for other HNBS in this CSG is just the one that the HNB should connect to.

In operation 303, OMC transmits the "attachment response" message to the HNB2. This message indicates the MME that the OMC selected for the HNB. And the MME information included in the message may be the IP address of the MME. Optionally, this message contains a list of other HNBs necessary to establish X2 and adjacent to the HNB. The HNB list information included in the message is an IP address list for the HNB. Optionally, the message contains a frequency for using the HNB. The "attachment response" message contains the information on adjacent cells. The "attachment response" message contains the track area identifier (TAI) for the HNB. The "attachment response" message contains the identifier assigned to the HNB. Optionally, the message contains the address of the S-GW that OMC selected for the HNB.

In operation 304, HNB2 initiates a process to establish a connection with the HNB indicated by the message. HNB2 transmits the "connection request" message to the other HNB (e.g., HNB1). HNB1 transmits the "connection response" message to HNB2.

In operation 305, HNB2 initiates a process to establish a connection with the MME indicated by the message. HNB2 transmits the "connection request" message to MME. The message contains the information on "cells which are overlapped with the HNB or CSG". The message contains the information element of the identifier of the TAI where HNB locates. Optionally, the message contains the information element of the identifier of HNB. Optionally, the message contains the information element of the identifier of the CSG where HNB locates. MME transmits the "connection response" message to HNB2.

The sequence of performing operation 304 and operation 305 is not limited.

Figure 4:
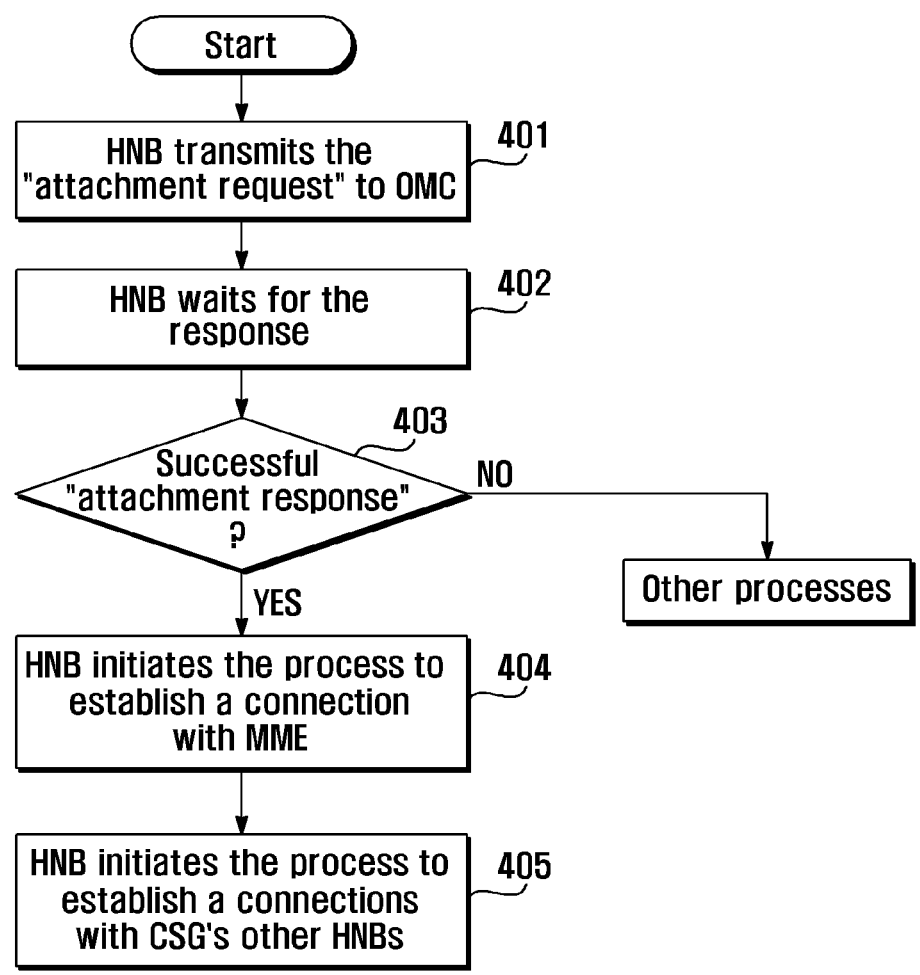
FIG. 4 shows an operation flows at HNB according to embodiment 1 and embodiment 2 respectively.

In this embodiment, the operation flow of HNB is illustrated in FIG. 4. Here, detailed technical description for known components is omitted.

In 401, HNB transmits the "attachment request" message to the OMC. This message contains the information on the location of HNB. Optionally, the "attachment request" message contains the identifier of the CSG to which the HNB2 belongs. In 402, HNB waits for the response message. In 403, if HNB receives a "successful attachment response" message, it saves the information that is included in the message, such as information on MME and the information on other HNBs, TAI, the HNB identifier and so on. In 404, HNB initiates the process to establish a connection with the MME indicated by the message. HNB transmits the "connection request" message to MME. Optionally, the message contains the information on "cells which are overlapped with the HNB or CSG". Optionally, the message contains the information element of the identifier of the TAI where HNB locates. Optionally, the message contains the information element of the identifier of HNB. Optionally, the message contains the information element of the identifier of the CSG where HNB locates. MME transmits the "connection response" message to HNB. 405 Optionally, if the "attachment response" message contains information on other HNBs, such as HNB IP address list, HNB initiates the process to establish connections with other HNBs. HNB transmits the "connection request" to another HNB. Another HNB transmits the "connection response" message to the HNB.

The sequence of performing operation 404 and operation 405 is not limited.

Figure 5:
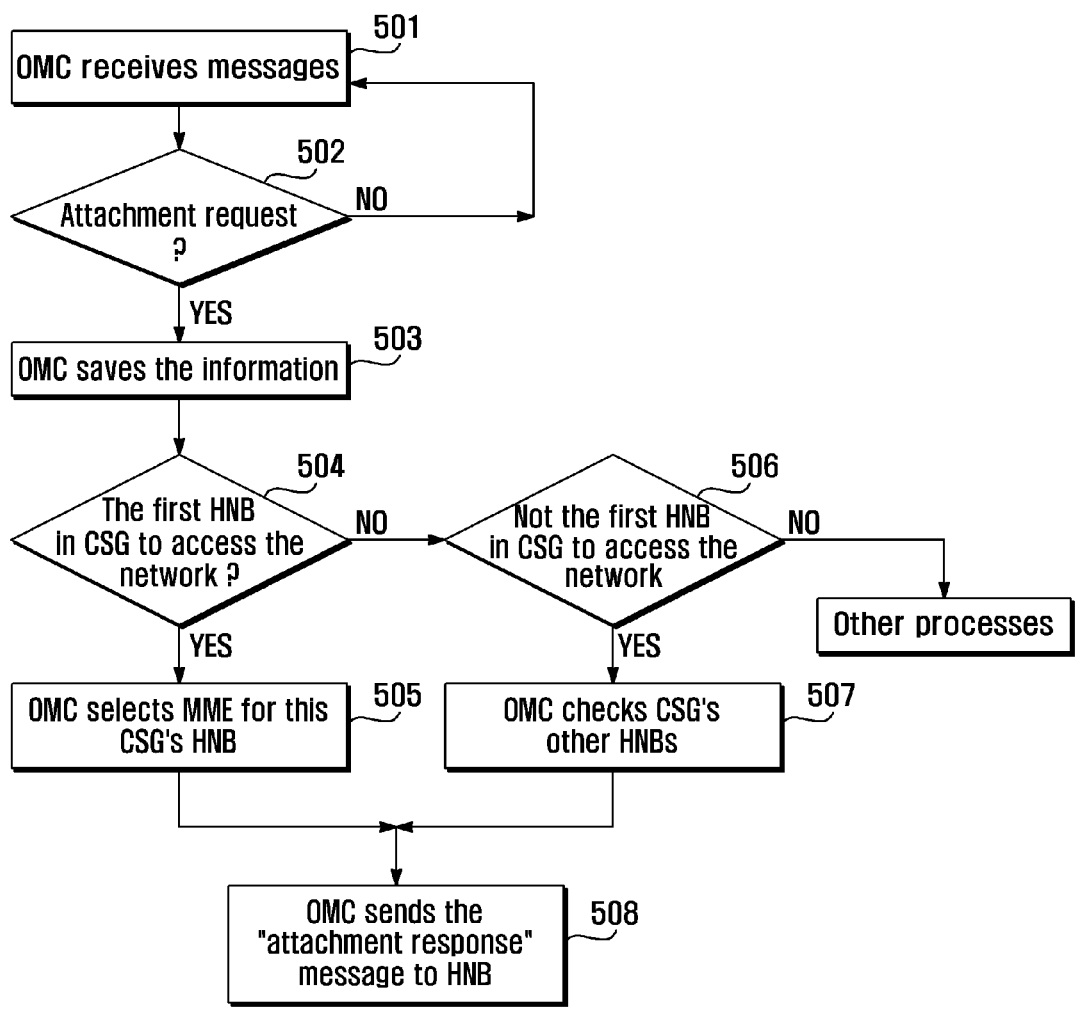
FIG. 5 shows an operation flows at OMC according to embodiment 1 and embodiment 2 respectively.

In this embodiment, the operation flow of OMC is illustrated in FIG. 5. Here, detailed technical description for known components is omitted.

In 501, OMC receives messages. In 502, if OMC receives the "attachment request" message from HNB, in 503 it saves HNB related information. And if the message contains the location information for HNB, OMC saves this information. And if the message contains the identifier of the CSG where the HNB belongs, OMC saves this information.

In 504, if the HNB is the first to access the network in corresponding CSG, in 505, OMC selects an MME for HNB in this CSG. OMC selects the MME according to either the address of HNB, or the rule to balance load or to reduce the possibility of changing MME when a UE moves, etc. Optionally, OMC can select an S-GW for the HNB according to the same rule as on the selection of MME.

In operation 506, if HNB is not the first to access the network in the CSG, 507 OMC checks other HNBs in the CSG. 508 OMC transmits the "attachment response" message to the requesting HNB. And information on the MME OMC selected for HNB in this CSG is included in the message. Optionally, the "attachment response" message contains the information on the S-GW selected by OMC for HNB in this CSG. Optionally, the message contains the information on other HNBs in this CSG, such as the IP address list for the HNB. Optionally, the message contains the identifier of the TAI where the HNB locates. Optionally, the message contains the HNB identifier allocated to the HNB. The case described above is for that the HNBs in the CSG are not far away from one another. In another case, for example, two HNBs belong to the same CSG in different countries but in the same company, if no adjacent HNB accesses the network, OMC thinks that this HNB is the first one which accesses the network in the CSG and selects an MME for it according to such rules as to balance load or to reduce possibility of changing MME when a UE moves, and so on. Optionally, OMC can select an S-GW for the HNB according to the same rule as on the selection of MME. In this case, OMC finds the other HNB is the one necessary to establish a X2 connection with the HNB in the CSG according to not only the CSG ID. Meanwhile, it should consider the location of the HNB. For example, it is not necessary to establish interface X2 between two HNBs if the two HNBs that are in different countries but in the same company belong to the same CSG.

Figure 6:
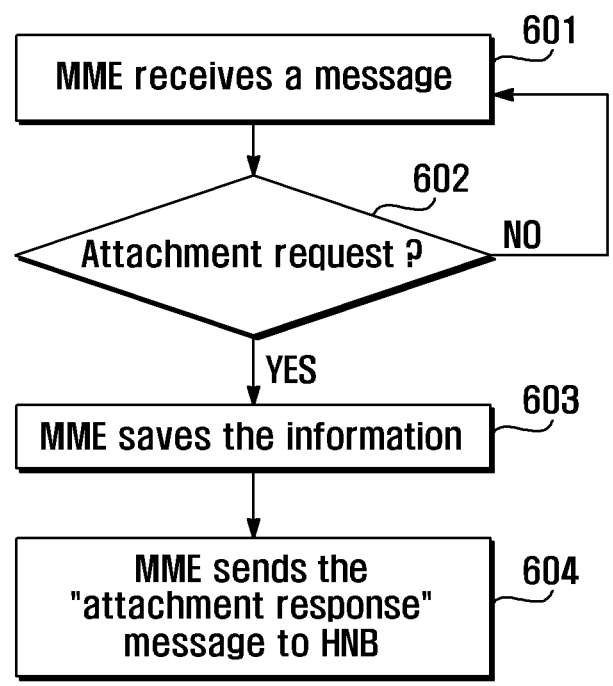
FIG. 6 shows an operation flows at MME according to embodiment 1 and embodiment 2 respectively.

In this embodiment, the operation flow of MME is illustrated in FIG. 6. Here, detailed technical description for the known components is omitted.

In 601 MME receives messages. In 602 if MME receives the "connection request" message from HNB, in 603 MME saves the information which is included in this message, such as the information on "cells which is overlapped with the HNB or CSG", the identifier of the TAI where HNB locates, the HNB identifier. 604 MME transmits the "connection response" message to HNB.

Figure 7:
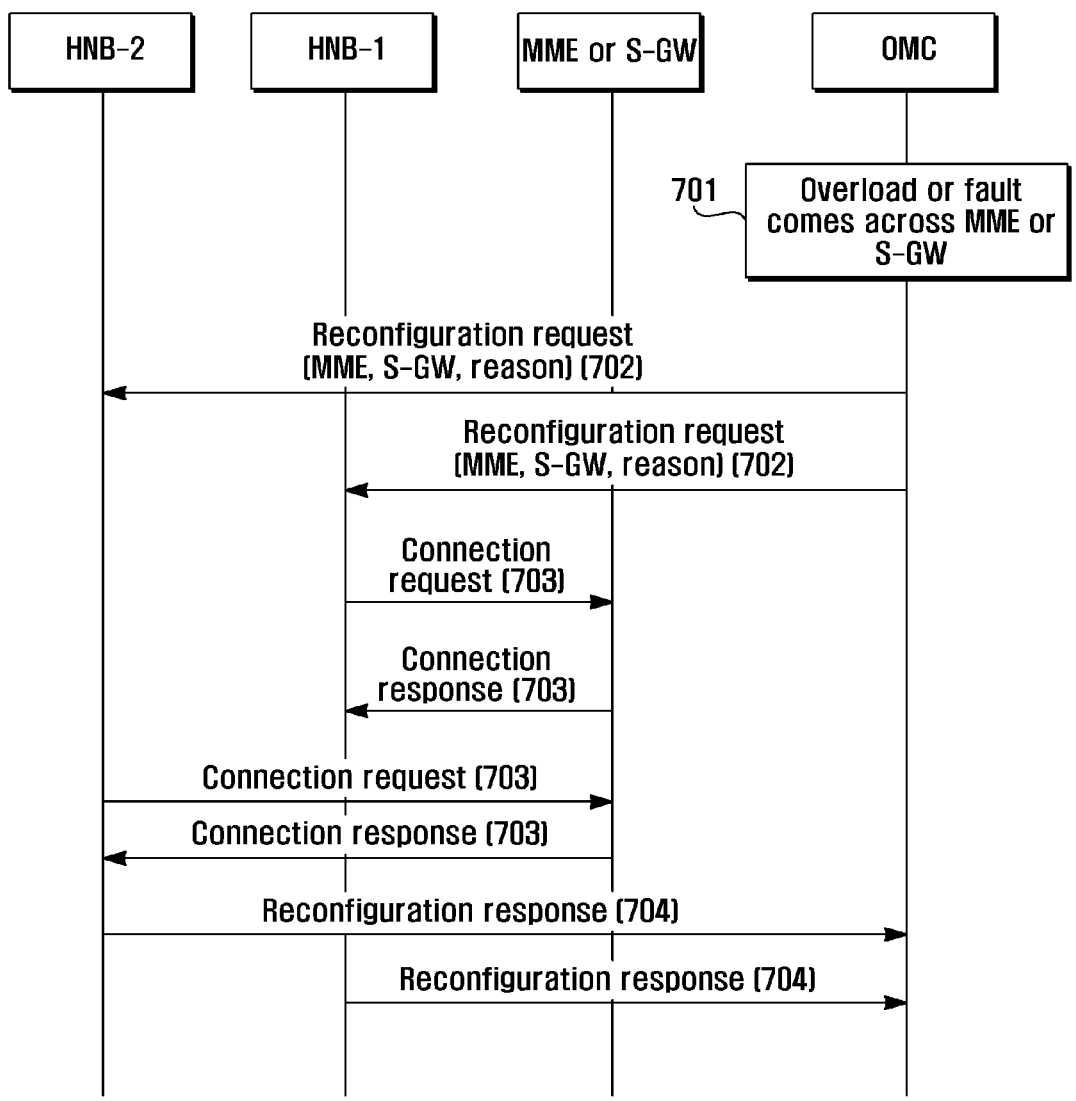
FIG. 7 shows a process of reconfiguring MME or S-GW.

FIG. 7 illustrates the process that OMC reconfigures CSG's MME or S-GW when overload or fault comes across the MME or the S-GW.

In operation 701, OMC finds that overload or fault comes across the MME or S-GW connected to a certain CSG.

In operation 702, OMC transmits a "reconfiguration request" message to the HNB in CSG. In this message, the information on the reconfigured MME or S-GW and the reason for the reconfiguration are included. And the reconfiguration can be done to the IP address of the MME or the S-GW.

In operation 703, the HNB that has received the "reconfiguration request" message transmits the "connection request" message to the new MME or S-GW. Optionally, the "connection request" message sent to MME includes the information on "cells which are overlapped with the HNB or CSG". Optionally, the "connection request" message sent to MME contains the information element of the identifier of the TAI where HNB locates. The new MME or S-GW transmits the "connection response" message to the HNB.

In operation 704, the HNB transmits a "reconfiguration response" message to OMC.

Optionally, if the reconfiguration results from the overload of MME or S-GW, HNB initiates the process of releasing the connection with original MME or S-GW.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a server in a communication system, the method comprising:
   receiving a first request message from a base station, the first request message including information on a location of the base station to be verified by the server; and
   transmitting a first response message to the base station in response to the first request message, the first response message including information on a mobility management entity (MME) assigned based on the first request message,
   wherein a second request message to be transmitted to the MME is generated based on the first response message and the second request message includes a first identifier of the base station.

2. The method of claim 1, wherein the first request message further includes a second identifier of the base station.

3. The method of claim 1, wherein the second request message further includes at least one of information on supported tracking area related to the base station and information on a closed subscriber group (CSG) related to the base station.

4. The method of claim 1, wherein the first response message further includes a list of at least one candidate base station.

5. The method of claim 4, wherein a third request message to be transmitted to the at least one candidate base station is generated based on the first response message, and wherein the third request message includes at least one of neighbor information on the base station, information on a CSG related to the base station, the first identifier of the base station, and information on tracking area related to the base station.

6. A method by a base station in a communication system, the method comprising:
   transmitting a first request message to a server, the first request message including information on a location of the base station to be verified by the server;
   receiving a first response message from the server in response to the first request message, the first response message including information on a mobility management entity (MME) assigned based on the first request message; and
   transmitting a second request message to the MIME based on the first response message, the second request message including a first identifier of the base station.

7. The method of claim 6, wherein the first request message further includes a second identifier of the base station.

8. The method of claim 6, wherein the second request message further includes at least one of information on supported tracking area related to the base station and information on a closed subscriber group (CSG) related to the base station.

9. The method of claim 6, wherein the first response message further includes a list of at least one candidate base station.

10. The method of claim 9, further comprises:
    transmitting a third request message to the at least one candidate base station based on the first response message,
    wherein the third request message includes at least one of neighbor information on the base station, information on a CSG related to the base station, the first identifier of the base station, and information on tracking area related to the base station.

11. A server in a communication system, the server comprising:
    a transceiver for transmitting and receiving a signal; and
    a controller configured to:
      receive a first request message from a base station, the first request message including information on a location of the base station to be verified by the server, and
      transmit a first response message to the base station in response to the first request message, the first response message including information on a mobility management entity (MIME) assigned based on the first request message,
    wherein a second request message to be transmitted to the MIME is generated based on the first response message and the second request message includes a first identifier of the base station.

12. The server of claim 11, wherein the first request message further includes a second identifier of the base station.

13. The server of claim 11, wherein the second request message further includes at least one of information on supported tracking area related to the base station and information on a closed subscriber group (CSG) related to the base station.

14. The server of claim 11, wherein the first response message further includes a list of at least one candidate base station.

15. The server of claim 14, wherein a third request message to be transmitted to the at least one candidate base station is generated based on the first response message, and
wherein the third request message includes at least one of neighbor information on the base station, information on a CSG related to the base station, the first identifier of the base station, and information on tracking area related to the base station.

16. A base station in a communication system, the base station comprising:
a transceiver for transmitting and receiving a signal; and
a controller configured to:
transmit a first request message to a server, the first request message including information on a location of the base station to be verified by the server,
receive a first response message from the server in response to the first request message, the first response message including information on a mobility management entity (MME) assigned based on the first request message, and
transmit a second request message to the MME based on the first response message, the second request message including a first identifier of the base station.

17. The base station of claim 16, wherein the first request message further includes a second identifier of the base station.

18. The base station of claim 16, wherein the second request message further includes at least one of information on supported tracking area related to the base station and information on a closed subscriber group (CSG) related to the base station.

19. The base station of claim 16, wherein the first response message further includes a list of at least one candidate base station.

20. The base station of claim 19, wherein the controller is further configure to transmit a third request message to the at least one candidate base station based on the first response message, and
wherein the third request message includes at least one of neighbor information on the base station, information on a CSG related to the base station, the first identifier of the base station, and information on tracking area related to the base station.

* * * * *